Figure 1:
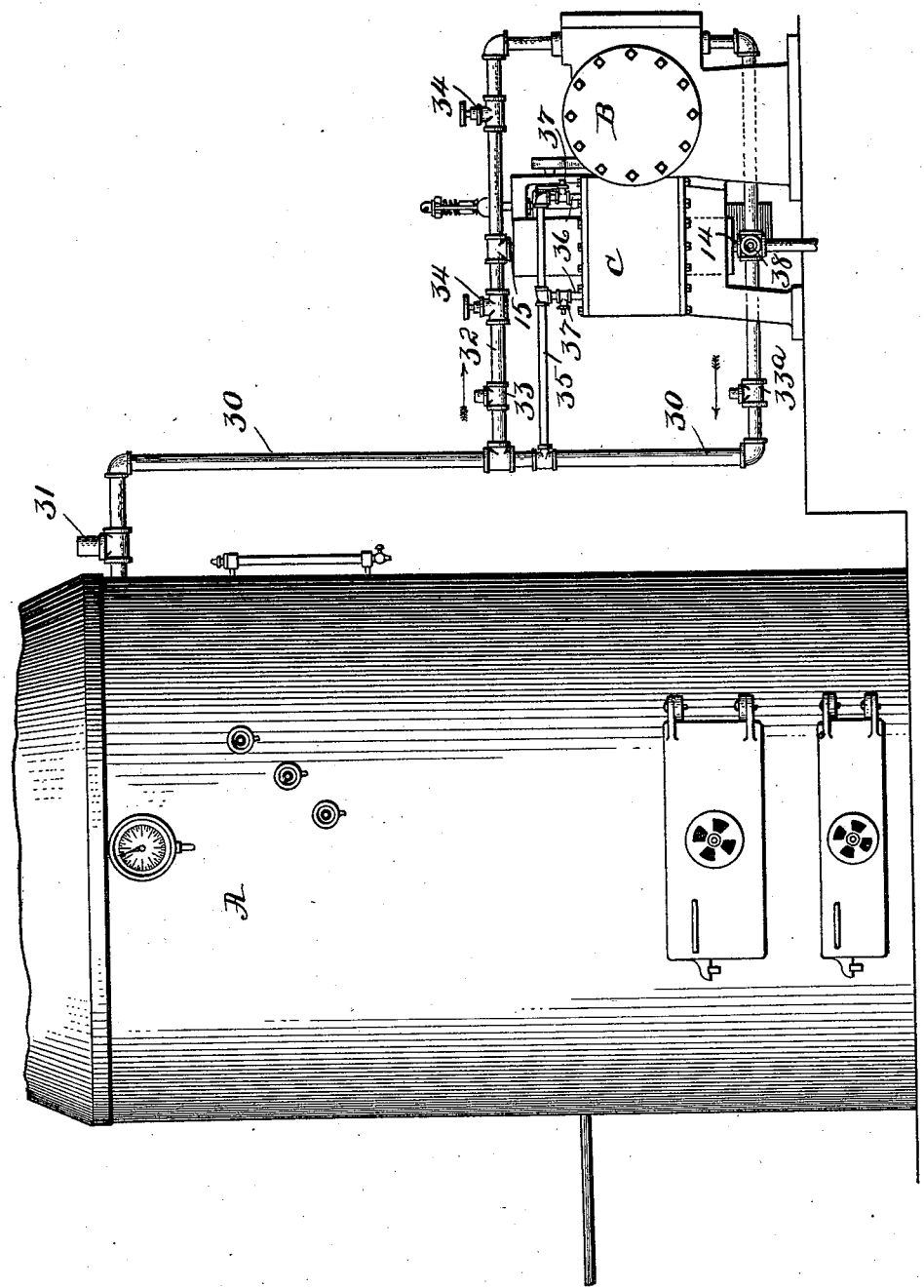

(No Model.) 7 Sheets—Sheet 1.

O. D. McCLELLAN & W. T. GIRLING.
MEANS FOR REHEATING EXHAUST STEAM.

No. 574,160. Patented Dec. 29, 1896.

Witnesses.
Jesse B. Keller
A. V. Groupe

Inventors:
Oscar D. McClellan
Wilkinson T. Girling
per John A. Nolan
Attorney.

(No Model.) 7 Sheets—Sheet 2.

O. D. McCLELLAN & W. T. GIRLING.
MEANS FOR REHEATING EXHAUST STEAM.

No. 574,160. Patented Dec. 29, 1896.

(No Model.) 7 Sheets—Sheet 3.

O. D. McCLELLAN & W. T. GIRLING.
MEANS FOR REHEATING EXHAUST STEAM.

No. 574,160. Patented Dec. 29, 1896.

Witnesses.
Jesse B. Heller,
A. V. Groupy

Inventors:
Oscar D. McClellan
Wilkinson T. Girling,
per John R. Nolan
Attorney.

(No Model.) 7 Sheets—Sheet 5.

O. D. McCLELLAN & W. T. GIRLING.
MEANS FOR REHEATING EXHAUST STEAM.

No. 574,160. Patented Dec. 29, 1896.

Witnesses.
Jesse B. Heller
A. V. Groupp

Inventors:
Oscar D. McClellan
Wilkinson T. Girling,
per John F. Mead
Attorney.

(No Model.) 7 Sheets—Sheet 6.
O. D. McCLELLAN & W. T. GIRLING.
MEANS FOR REHEATING EXHAUST STEAM.
No. 574,160. Patented Dec. 29, 1896.
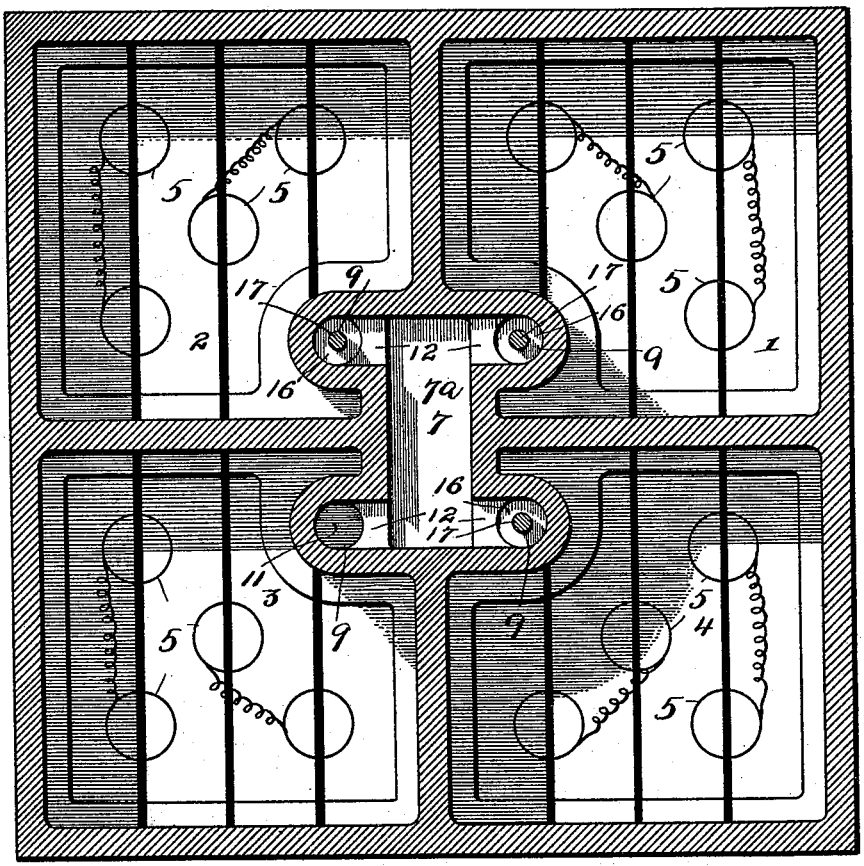
Witnesses.
Jesse B. Heller
A. V. Groupy
Inventors:
Oscar D. McClellan
Wilkinson T. Girling
per John R. Nolan
Attorney.

(No Model.) 7 Sheets—Sheet 7.
O. D. McCLELLAN & W. T. GIRLING.
MEANS FOR REHEATING EXHAUST STEAM.
No. 574,160. Patented Dec. 29, 1896.
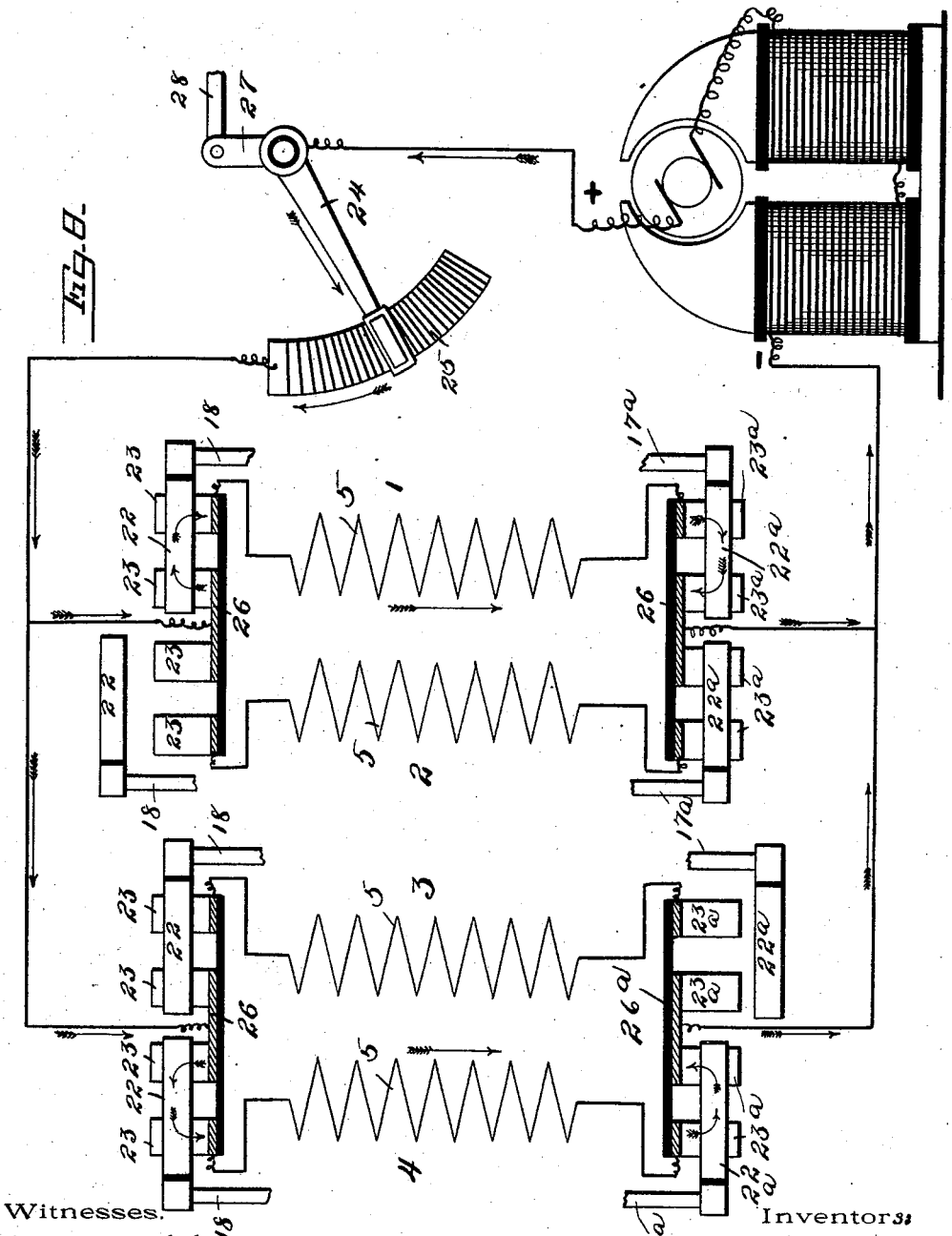
Witnesses:
Jesse B. Heller
A. T. Groupe
Inventors:
Oscar D. McClellan
Wilkinson T. Girling,
per John R. Nolan
Attorney.

UNITED STATES PATENT OFFICE.

OSCAR D. McCLELLAN AND WILKINSON T. GIRLING, OF PHILADELPHIA, PENNSYLVANIA, ASSIGNORS TO THEMSELVES, JOHN J. TORPEY, AND ROBERT CUNNINGHAM, OF SAME PLACE.

MEANS FOR REHEATING EXHAUST-STEAM.

SPECIFICATION forming part of Letters Patent No. 574,160, dated December 29, 1896.

Application filed July 1, 1896. Serial No. 597,707. (No model.)

*To all whom it may concern:*

Be it known that we, OSCAR D. MCCLELLAN and WILKINSON T. GIRLING, citizens of the United States, residing in the city and county of Philadelphia and State of Pennsylvania, have invented certain new and useful Improvements in Means for Reheating Exhaust-Steam, of which the following is a full, clear, and exact description, reference being had to the accompanying drawings, forming a part of this specification.

The object of this invention is to provide a means for treating exhaust-steam as it is discharged from the cylinder of a steam-engine, to the end that such steam may be returned to the engine under conditions of the highest efficiency and with as great uniformity and regularity as though it were conducted thereto directly from the boiler, and this without the expenditure of the force that has heretofore been required to expel or expand the exhaust-steam to the atmosphere.

In carrying out our invention we conduct the exhaust-steam direct from the cylinder to an air-tight chamber or chambers, and therein subject it to an electric-flash heat, thereby instantaneously raising the pressure of the steam, in which condition it is returned to the engine for service, all as will be hereinafter fully described and claimed.

Figure 2:
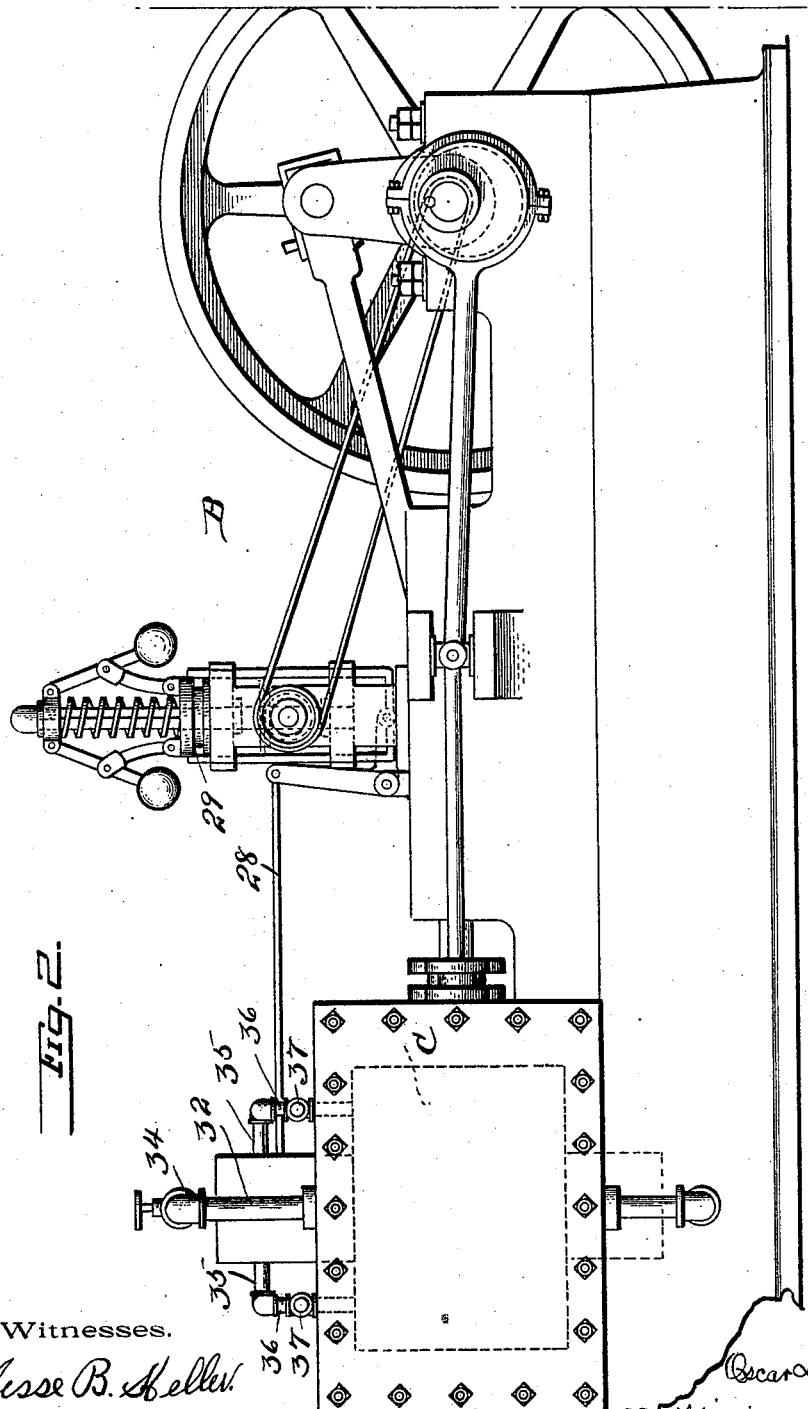
Figure 3:
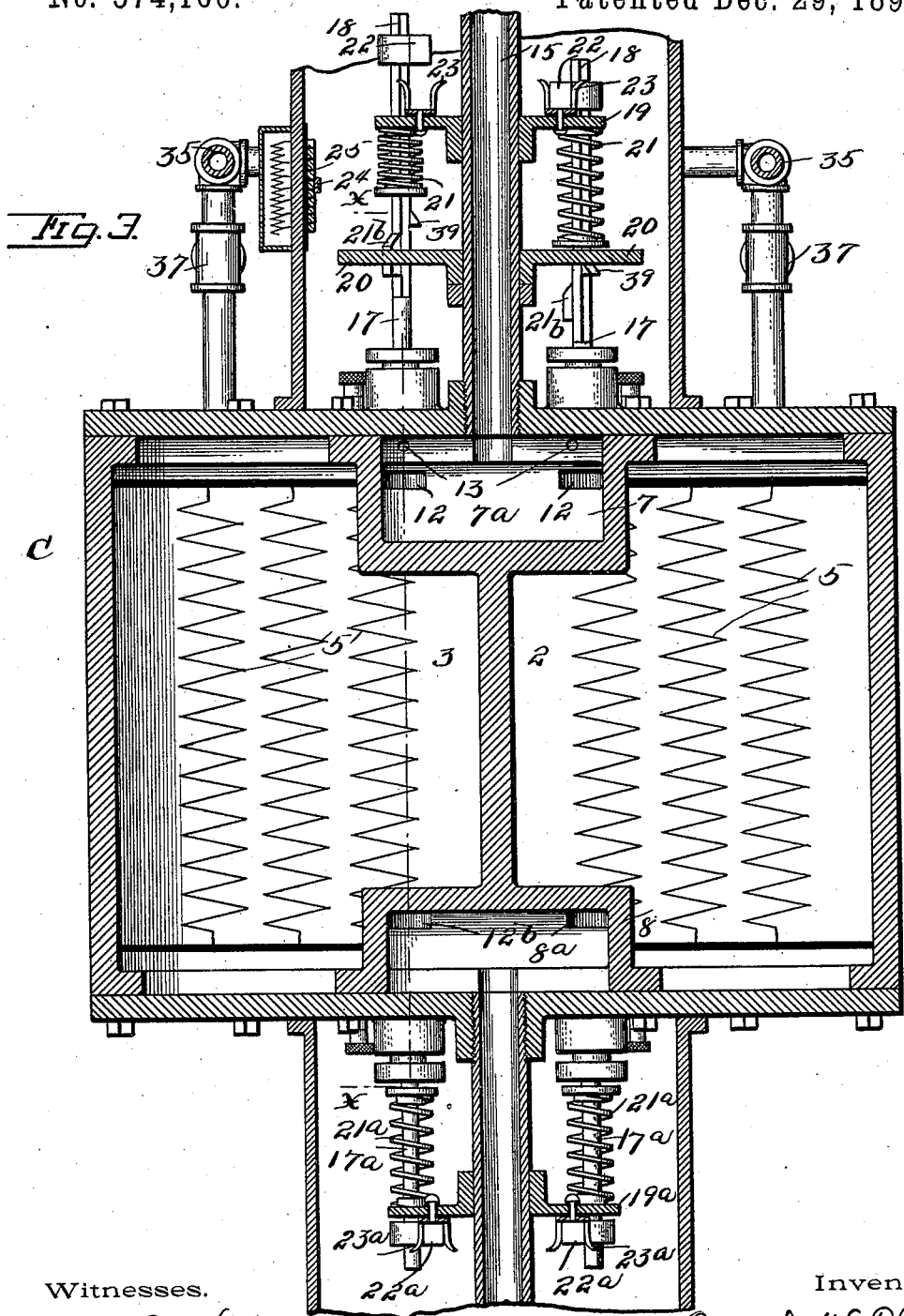
Figure 4:
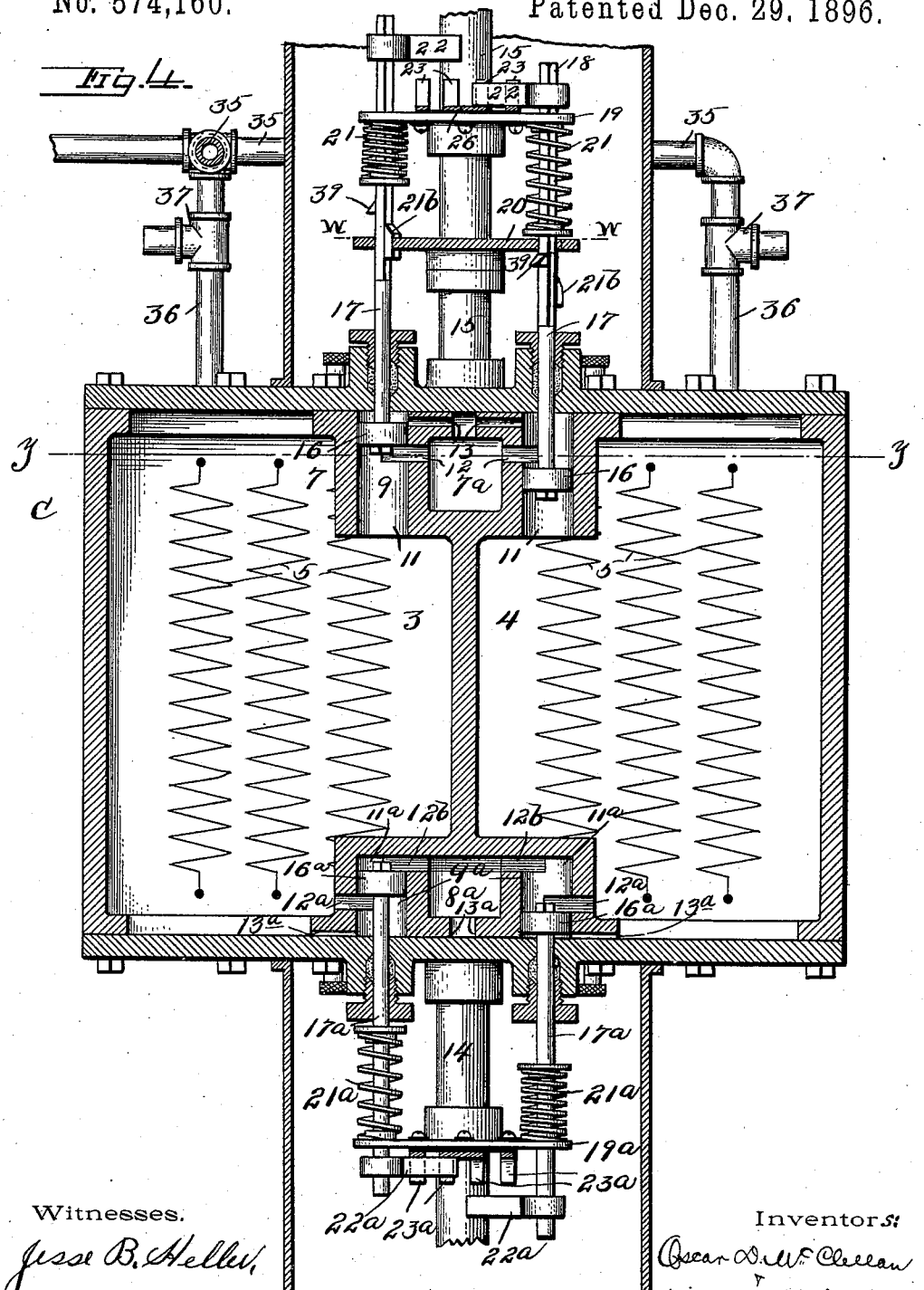
Figure 5:
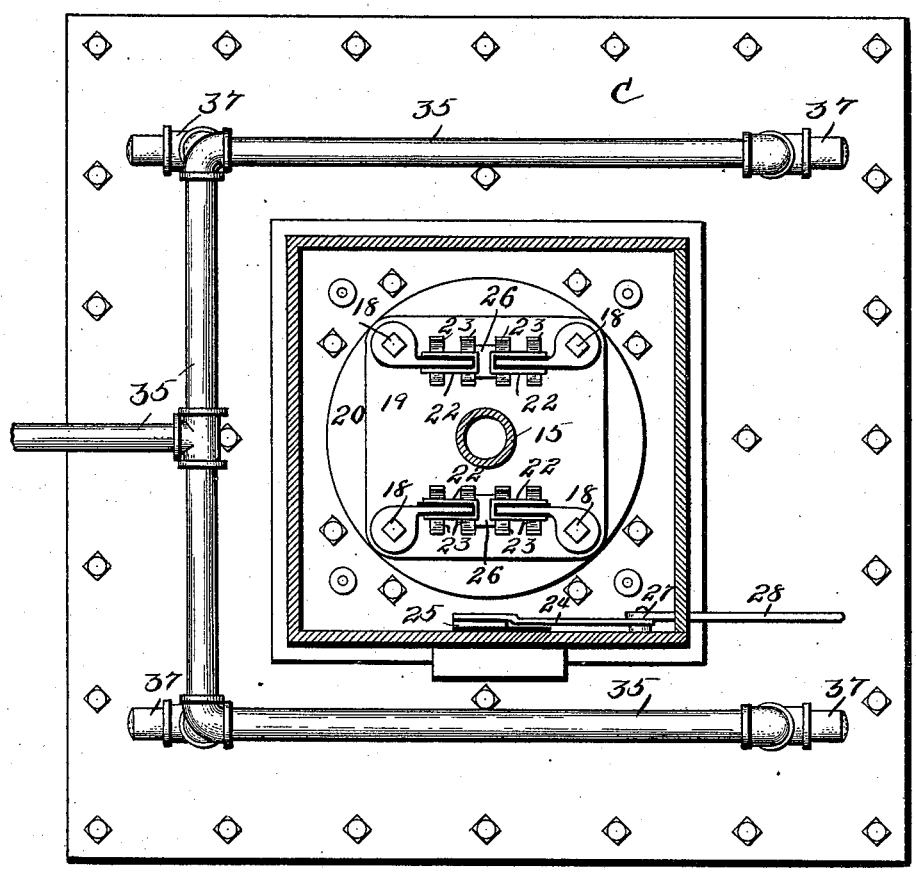
Figure 6:
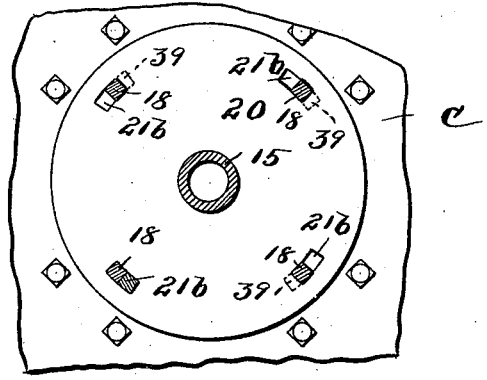

In the annexed drawings, Figure 1 is a front elevation of a boiler and steam-engine embodying our invention. Fig. 2 is a side elevation of the engine. Fig. 3 is a vertical section through the reheater. Fig. 4 is a similar section, as on the line $x\,x$ of Fig. 3. Fig. 5 is a plan with the switch-box in section. Fig. 6 is a detail plan, as on the line $w\,w$ of Fig. 4. Fig. 7 is a horizontal section, as on the line $y\,y$ of Fig. 4. Fig. 8 is a diagram of the electrical connections.

A represents a steam-boiler, B a steam-engine, and C a steam-reheating structure adjacent thereto. This structure is preferably, though not essentially, in the form of a rectangular casing divided into four air-tight compartments or chambers 1, 2, 3, and 4, in each of which is supported a series of electric resistance-coils 5, electrically connected with a suitably-disposed dynamo 6, whereby the coils may be instantaneously and successively heated to a state of incandescence for the purpose below described.

In the top and bottom of the structure are formed valve-boxes 7 and 8, respectively, in each of which is formed a chamber $7^a\,8^a$, with which communicate ports 9 and 10 from the respective reheating-chambers. The upper ports 9 comprise vertical portions 11, which open directly into the several reheating-chambers and are provided with lateral branches 12, leading to the chamber $7^a$. Communicating with this chamber and with the vertical port portions 11, at a point above the branch ports 12, are horizontal ports 13. The lower ports 10 comprise vertical portions $11^a$, provided with lateral branches $12^a\,12^b$, that lead to the chambers and the port $8^a$, respectively. Leading from the lower ends of the port portions $11^a$, to the chambers 1, 2, 3, and 4 are horizontal ports $13^a$. Opening into the chamber $8^a$ is a pipe 14, which has communication with the exhaust of the steam-engine, while opening into the upper chamber $7^a$ is a pipe 15, leading to the steam-chest of the engine.

Fitted to the vertical portions of each of the ports 9 is a piston-valve 16, the stem 17 of which rises through a suitable stuffing-box on the top of the casing and is provided with an extension 18, that is fitted to and guided in a head 19, affixed to the pipe 15. This extension also extends through a perforation in a disk 20, which is rotatably mounted on said pipe 15 a suitable distance below the fixed head, and which extension is provided with wedges or cams $21^b$, which coact with said disk, as will presently appear. Bearing against the head 19 and against a collar or shoulder on each of the extensions is a spiral spring 21, the tendency of which is to maintain the stem normally depressed, and thereby shut off communication between the reheating-chamber and the chamber $7^a$.

To the upper or free end of each of the extensions is affixed the blade 22 of an electrical switch, the clips 23 thereof being supported upon the head in such manner that when the valve-stem is raised the blade is instantly disengaged from the clips and when said stem is depressed the blade is correspondingly engaged with the clips.

To each of the lower ports 10 is fitted a piston-valve $16^a$, the stem $17^a$ of which depends through appropriate stuffing-boxes on the bottom of the casing. The stem extends through a fixed head $19^a$ on the pipe 14, a spring $21^a$ being provided which acts normally to raise the valve and shut off the communication between the reheating-chamber and the chamber $8^a$. On the lower or free end of each of the stems $17^a$ is a blade $22^a$, which coacts, similarly to that on the upper valve-stem, with clips $23^a$ on the lower head; that is to say, when the valve is in its normal or closed position the blade is in action and when the valve is in its depressed or open position the blade is disengaged from the clips.

The electrical connections will be more clearly understood by reference to the diagram Fig. 8, wherein it will be observed that the positive wire from the dynamo is connected with the swinging contact-arm 24 of a rheostat, thence from the resistance-plates 25 of the rheostat to plates 26, connecting the inner clips of the adjacent switches on the upper head 19, the outer clips thereof being connected with the respective resistance-coils of the reheating-chambers, the opposite ends of said coils being connected to the outer clips $23^a$ of the switches on the lower head $19^a$, and the return-wire to the dynamo being connected with the plates $26^a$, connecting the inner clips of said switches.

The contact-arm 24 of the rheostat is provided with a crank-arm 27, that is connected by means of a link 28 with the governor-head 29 of the steam-engine, to the end that the governor-balls as they raise or lower the head during the operation of the engine will actuate the contact-arm to regulate the resistance in a manner to increase or diminish the temperature in the chambers proportionally with the speed of the engine.

Leading from the steam-boiler A is a pipe 30, provided with a safety-valve 31, and leading from this pipe to the steam-chest of the engine is a branch pipe 32, provided with a check-valve 33 and with throttle-valves 34. The discharge-pipe 15 communicates with the pipe 32 intermediate the throttle-valves. Leading from the pipe 30, somewhat below the pipe 32, is a pipe 35, to which are connected four pipes 36, leading to the chambers 1 2 3 4, respectively, which latter pipes are each provided with a safety-valve 37. The lower extension of the pipe 30 is connected with the pipe 14 and is also equipped with a check-valve $33^a$. The pipes 14 and 30 are connected by means of a three-way cock 38.

The operation is as follows: At the outset a fire is started in the furnace below the boiler and steam is raised to low pressure. The throttle-valves 34 34 then being opened, the steam passes from the boiler to the steam-chest of the engine, and the latter is thereby set in operation. While starting the engine the engineer opens the valve 38 on the exhaust-pipe and at the same time starts up the dynamo. When sufficient energy has been generated to bring the coils to a state of incandescence sufficient to heat the exhaust-steam that may be conducted to one of the chambers, say chamber 1, the valve 38 is closed and the valve on the pipe leading to the chamber $8^a$ is opened, the exhaust-steam thus flowing to such chamber from the steam-chest of the engine. The valves on the remaining pipes will be maintained closed, but at the next stroke of the engine the valve-port leading to chamber 2 will be opened and that chamber supplied with exhaust steam. In the following stroke of the engine the valve-port leading to chamber 3 will be opened and that chamber will be charged with exhaust-steam. At this stage the steam in chamber 1 will have been raised to high pressure and will raise and open the valve at the top of said chamber, enter the chamber $7^a$, and pass by way of the pipe 15 to the live-steam pipe 32, thence to the steam-chest of the engine. The exhaust will then be permitted to pass from the engine to chamber 4.

When the valve at the top of chamber 1 is raised by the high pressure of the steam, as just stated, the cam 21 on the valve-stem will bear against the edge of the opening in the disk 20, thereby slightly turning the latter, the openings through which pass the other valve-stems thus being shifted to check the underlying stops $21^a$ on the stems from passing through such openings, and thus preventing the valves in the remaining chambers 2, 3, and 4 from opening until the next stroke of the engine. At that time the pressure will be equal on the top and bottom of the discharge-valve of chamber 1, the spring thus depressing the valve-stem and moving the cam thereon below the opening in the disk, whereupon the steam in the next chamber 2, having been raised to high pressure, will open the discharge-valve and escape to the steam-chest. At the same time the head will be shifted to lock the other valves in the depressed or closed position, and the operation of introducing the steam to the chambers successively, reheating it therein, and discharging the same to the steam-chest of the engine will be carried on continuously.

The function of the ports $13^a$ is to permit the pressure of the exhaust-steam, immediately upon its introduction to the chambers 1, 2, 3, and 4, to act against the under sides of the respective valves $16^a$, thus equalizing the pressure upon the top and bottom of said valves and permitting their respective springs $21^a$ to raise the same in a manner to cut off the communication between the chamber $8^a$ and said chambers 1, 2, 3, and 4 in succession.

It will be obvious that the rapid flashing of the heat in the successive air-tight chambers will instantaneously raise the pressure of the steam therein in rapid succession, to the end that such steam will be returned to the engine under conditions of the highest efficiency and with as great uniformity and regularity as though it were conducted directly thereto from the boiler.

It will also be obvious that as the steam is introduced to and reheated in air-tight chambers the benefit of a vacuum, so to say, is secured, thereby obviating and utilizing the force heretofore required to expel or expand the exhaust-steam to the atmosphere.

We claim as our invention—

1. The combination, with a steam-engine, of a heating-chamber, means whereby the exhaust-steam from the engine is delivered to said chamber, electrical heating devices in said chamber, means for supplying an electric current thereto at predetermined intervals and means whereby the reheated steam in said chamber is returned to the engine, substantially as described.

2. The combination, with a steam-engine, of a series of heating-chambers, means whereby the exhaust-steam from the engine is delivered to the successive chambers, means for producing an electrical flash heat in said chambers, and means whereby the reheated steam in the successive chambers is returned to the engine, substantially as described.

3. The combination, with a steam-engine, of a series of heating-chambers, means whereby the exhaust-steam from the engine is delivered to said chambers, valves to control such delivery, resistance-coils in said chambers, switch devices for controlling the passage of the electrical current thereto at predetermined intervals, and means whereby the reheated steam in the successive chambers is returned to the engine, substantially as described.

4. The combination, with a steam-engine, of a series of heating-chambers, ingress and egress pipes providing communication between said chambers and the steam-engine, valves controlling the communication between said pipes and the chambers, means for locking and releasing said valves at predetermined intervals, electrical resistance devices in said chambers, a source of electric energy, and electrical connections between the same and said devices, substantially as described.

5. The combination, with a steam-engine, of a series of heating-chambers, ingress and egress pipes providing communication between said chambers and the steam-engine, valves controlling the communication between said pipes and the chambers, means for locking and releasing said valves at predetermined intervals, electrical resistance devices in said chambers, switches connected with said valves and resistance devices, a source of electric energy, and electrical connections between the same and said switches, substantially as described.

6. The combination, with a steam-engine, of a series of heating-chambers, ingress and egress pipes providing communication between said chambers and the steam-engine, valves controlling the communication between said pipes and the chambers, means for locking and releasing said valves at predetermined intervals, electrical resistance devices in said chambers, a source of electric energy, and electrical connections between the same and said devices, together with a rheostat, and controlling devices therefor between the same and the governor of the engine, substantially as described.

In testimony whereof we have hereunto affixed our signatures in the presence of two subscribing witnesses.

OSCAR D. McCLELLAN.
WILKINSON T. GIRLING.

Witnesses:
EDDY L. CLARK,
JOHN R. NOLAN.